United States Patent [19]
Sugiyama

[11] 4,062,622
[45] Dec. 13, 1977

[54] SMALL SIZE RETROFOCUS WIDE ANGLE PHOTOGRAPHIC LENS

[75] Inventor: Takahiro Sugiyama, Tokyo, Japan

[73] Assignee: Asahi Kogaku Kogyo Kabushiki Kaisha, Tokyo, Japan

[21] Appl. No.: 687,814

[22] Filed: May 19, 1976

[30] Foreign Application Priority Data

May 22, 1975   Japan .................................. 50-61293

[51] Int. Cl.² ............................ G02B 9/64; G02B 1/00
[52] U.S. Cl. .................................. 350/214; 350/176; 350/177; 350/207
[58] Field of Search ................ 351/214, 176, 177, 207

[56] References Cited
U.S. PATENT DOCUMENTS

| 3,512,874 | 5/1970 | Wöltche | 350/214 |
| 3,740,120 | 6/1973 | Rühl | 350/214 |
| 3,975,091 | 8/1976 | Yasuo | 350/214 |
| 3,992,086 | 11/1976 | Yamashita | 350/214 |

Primary Examiner—Paul A. Sacher
Attorney, Agent, or Firm—Sughrue, Rothwell, Mion, Zinn and Macpeak

[57] ABSTRACT

A small size, wide angle, retrofocus photographic lens is disclosed consisting of eight lens elements. The lens has a relative aperature of 1:4.0 and a field angle of 94°.

6 Claims, 4 Drawing Figures

SMALL SIZE RETROFOCUS WIDE ANGLE PHOTOGRAPHIC LENS

BACKGROUND OF THE INVENTION

This invention relates to a retrofocus type wide angle photographic lens having a back focus sufficient to be mounted on a monocular reflex camera, and which is small in size, has a relative aperature 1 : 4.0, and a field angle of 94°.

SUMMARY OF THE INVENTION

The photographic lens according to the invention consists of seven groups. The term "group" is defined as one or more lens elements making up a functional lens unit. In accordance with the specific embodiment of the present invention, however, the first thru the fifth groups and the seventh group consist of a single lens element each. The sixth group consists two lens elements which may be cemented together or separated from one another. The first group is a positive lens, the second group a negative meniscus lens having a convex surface directed toward the object, the third group a negative meniscus lens having a convex surface directed toward the object, the fourth group a positive lens, the fifth group a positive lens, the sixth group consists of one negative and one positive lens cemented together or separated from each other, but as a whole presenting a positive focal distance, and the seventh group is a positive lens. A diaphragm is provided between the fourth and fifth groups.

DETAILED DESCRIPTION OF THE INVENTION

Figure 1:
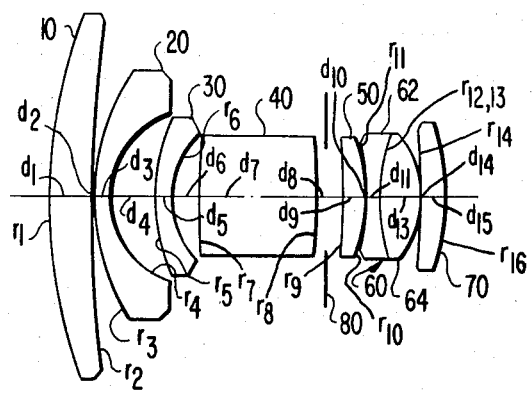
FIG. 1 is a diagram showing the composition of the lens constituting a first example of the invention.
Figure 3:
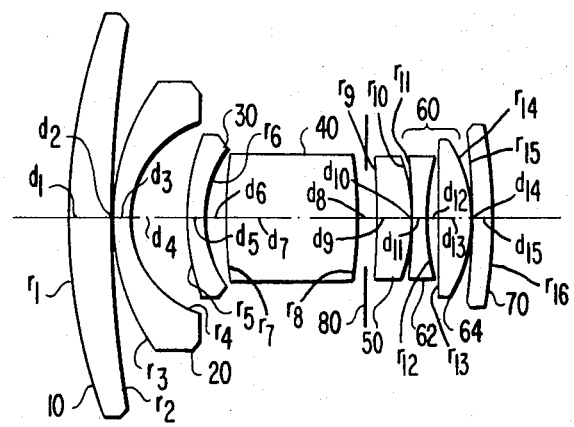
FIG. 3 is a diagram showing the composition of the lens constituting a second example of the invention.

Referring to the side views of the lens according to examples 1 and 2, shown in FIGS. 1 and 3, respectively, the individual lens elements are positioned along the optical axis 2. The lenses are shown such that the object side is on the left and the image side is on the right. Inasmuch as each of groups one thru five and seven consist of a single lens apiece, the respective groups and lens elements are designated by the same numerals, i.e. numerals 10, 20, 30, 40, 50, and 70 respectively. The two lens elements in group six are designated collectively by numeral 60 and individually by numerals 62 and 64. In example 1, shown in FIG. 1, lenses 62 and 64 are cemented together. In example number 2, in FIG. 3, lens elements 62 and 64 are separate from one another. The lens surfaces are designated by $r_1, r_2, r_3 \ldots$, and the distance between any two surfaces along the optical axis is designated by $d_i$, where $d_i$ is the distance between surfaces $r_i$ and $r_{i+1}$.

The lens 10 is a positive lens. Lens 20 is a negative meniscus lens having a convex surface $r_3$ directed toward the object side of the lens system. Lens 30 is also a negative meniscus lens having its convex surface directed toward the object side. Lens 40 is a positive lens and so is lens 50. A diaphram 80 is positioned between lenses 40 and 50. Lens 62 is a negative lens, and lens 64 is a positive lens. Lens 70 is also a positive lens.

The photographic lens of the above described composition is specifically designed to satisfy following requirements:

$$F/2.25 < |F_{1,2,3}| < F/1.65, F_{1,2,3} < 0 \quad (1)$$

$$F/0.7 < |F_{1,2,3,4}| < F/0.4, F_{1,2,3,4} < 0 \quad (2)$$

$$F/0.8 < F_{1,2,3,4,5,6} < F/0.4 \quad (3)$$

$$0.35 < \frac{d_8 + d_9 + d_{10} + d_{11} + d_{12} + d_{13} + d_{14}}{d_1 + d_2 + d_3 + d_4 + d_5 + d_6 + d_7} < 0.7 \quad (4)$$

where,
F: focal distance of the entire lens system
$F_{1,2,\ldots,i}$: focal distance of a combination comprising the first group to i-th group
$r_j$: radius of curvature of the j-th surface
$d_j$: thickness or lens space of the j-th lens
$n_k$: refractive index of the k-th lens
$v_k$: Abbe value of the k-th lens Each of the requirements will now be described in detail.

The first requirement is important in the realization of the backfocus feature of the lens system. When the absolute value of $F_{1,2,3}$ is greater than the upper limit of F/1.65, the thickness or space between any of the lenses, downstream of the third group, which operate to diverge light fluxes, must be increased, and if it is desired to design the lens system maintaining an equal quantity of light, the size of the lens system, particularly the diameters of the lenses constituting the first group and the seventh group become large, thus reversing to the object of minimizing the lens system. When the absolute value is smaller than the lower limit of F/2.25, although the desired backfocus can be easily obtained, the focal distance of any of the lenses, downstream of the third group, which converge the light flux, becomes short, thus increasing the spherical aberration and coma aberration of the lens system.

The second requirement is one of the procedures for elongating the backfocus in relation with the first requirement. This requirement permits optimization of the diaphragm position within a small size lens system and permits the downstream groups of the lenses to be arranged so as to provide ample compensation of the abberrations. When the absolute value of $F_{1,2,3,4}$ is greater than F/0.4, a disadvantageous feature, from the viewpoint of the backfocus, results relative to the first requirement. For obviating this disadvantage, a smaller value of $F_{1,2,3}$ is desired. However, such a procedure decreases Petzval's sum of the lens system thus tending to collapse the aberration balance in a wide extent of the field angle. Conversely, when the absolute value of the focal distance is shorter than the lower limit of F/0.7, although such a condition constitutes an advantage to the backfocus feature of the lens system, the burden placed on the downstream groups of the lens system is thereby increased, which ultimately tends to collapse the aberration balance.

The third requirement is for defining the degree of the eighth lens and for appropriately compensating the coma aberration caused by light rays incident from widely different directions. When the focal distance is greater than the upper limit F/0.4, a stronger degree of the eighth lens is required, thus resulting in the provision of either the front surface of the eighth lens having a positive radius of curvature, or the rear surface of the same lens having a smaller negative radius of curvature. The former procedure tends to deteriorate the coma aberration for wide angles, and the latter procedure tends to deteriorate the spherical aberration and the sine condition of the lens system. Conversely, when the focal distance is shorter than the lower limit of F/0.8, the significance of the existence of the eighth lens is reduced, and the burdens for the seventh and fifth lenses are increased, with the simultaneous influence to the backfocusing feature.

The fourth requirement is for defining the balance between the forward groups and the rearward groups of the lenses viewed from the diaphragm. When the value exceeds the upper limit of 0.7, the diameters of the rearward groups of lenses must be increased for the purpose of increasing the light quantity passing therethrough, thus making it difficult to compensate the aberration in the rearward groups. For overcoming this difficulty, if the diameters of forward groups of lenses are decreased relative to those of the rearward groups of lenses, there will be a tendency towards problems in the backfocus feature, or a possibility of an insufficient quantity of peripheral light within a small lens system. Conversely, when the value is less than the lower limit of 0.35, the forward groups of the lenses become great in comparison with the rearward groups, thus making it difficult to obtain a lens system of small size.

By satisfying the above described requirements, a small size, wide angle, retrofocus photographic lens having a sufficient backfocus, a relative aperture of 1 : 4.0, and a wide field angle of 94° can be obtained.

Figure 2:
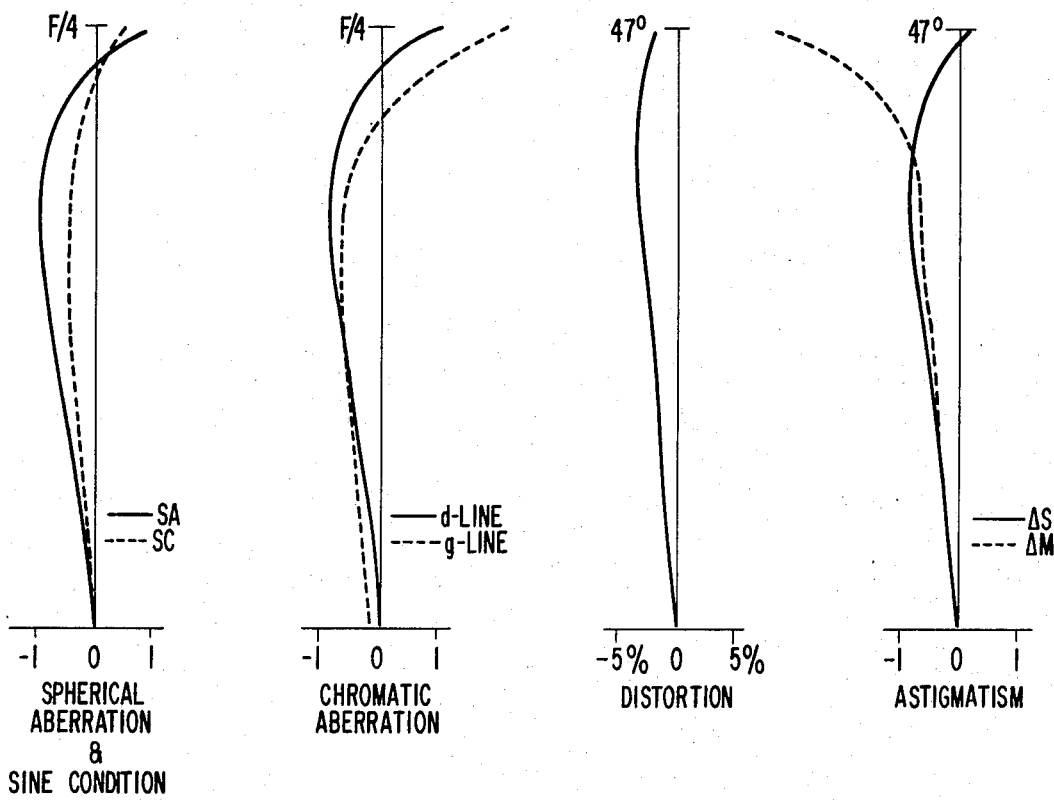
FIG. 2 is a graphical representation showing various aberration curves for the lens of the first example.
Figure 4:
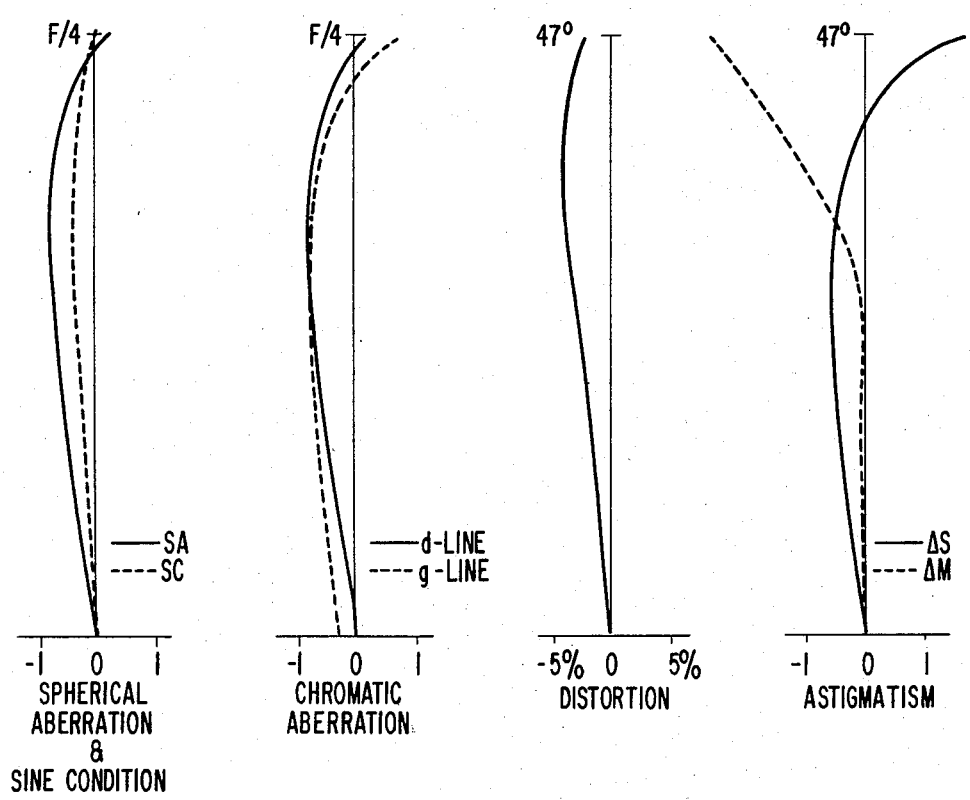
FIG. 4 is a graphical representation showing various aberration curves for the lens of the second example.

The specific parameters for examples 1 and 2 are given below, with all linear dimensions being in millimeters. The aberration curves resulting from lenses according to examples 1 and 2 are shown in FIGS. 2 and 4, respectively.

EXAMPLE 1

Relative aperture = 1 : 4.0, field angle = 94°, F = 100

| | | | | | |
|---|---|---|---|---|---|
| $r_1 =$ | 191.326 | $d_1 =$ | 17.969 | $n_1/v_1 =$ | 1.62041/60.3 |
| $r_2 =$ | 547.293 | $d_2 =$ | 0.486 | | |
| $r_3 =$ | 95.726 | $d_3 =$ | 5.828 | $n_2/v_2 =$ | 1.62041/60.3 |
| $r_4 =$ | 36.788 | $d_4 =$ | 19.766 | | |
| $r_5 =$ | 95.916 | $d_5 =$ | 5.828 | $n_3/v_3 =$ | 1.62230/53.2 |
| $r_6 =$ | 36.788 | $d_6 =$ | 9.956 | | |
| $r_7 =$ | 122.554 | $d_7 =$ | 49.973 | $n_4/v_4 =$ | 1.71736/29.5 |
| $r_8 =$ | −173.051 | $d_8 =$ | 9.082 | | |
| $r_9 =$ | −150.478 | $d_9 =$ | 9.519 | $n_5/v_5 =$ | 1.74077/27.8 |
| $r_{10} =$ | −69.448 | $d_{10} =$ | 0.534 | | |
| $r_{11} =$ | −148.526 | $d_{11} =$ | 5.828 | $n_6/v_6 =$ | 1.80518/25.4 |
| | | | is negligible | | |
| $r_{12}, r_{13} =$ | 75.776 | $d_{12}, d_{13} =$ | 15.104 | $n_7/v_7 =$ | 1.51823/59.0 |
| $r_{14} =$ | +53.621 | $d_{14} =$ | 1.845 | | |
| $r_{15} =$ | −183.221 | $d_{15} =$ | 7.868 | $n_8/v_8 =$ | 1.79952/42.2 |
| $r_{16} =$ | −136.851 | | | | | backfocus = 180.030
$F_{1,2,3} = -53.763$
$R_{1,2,3,4} = -216.920$
$F_{1,2,3,4,5,6} = 136.426$
$d_1 + d_2 + d_3 + d_4 + d_5 + d_6 + d_7 = 109.806$
$d_8 + d_9 + d_{10} + d_{11} + d_{12} + d_{13} + d_{14} = 49.780$
Petzval's sum = 0.039

EXAMPLE 2

Relative aperture = 1 : 4.0, field angle = 94°, F = 100

| | | | | | |
|---|---|---|---|---|---|
| $r_1 =$ | 231.621 | $d_1 =$ | 17.074 | $n_1/v_1 =$ | 1.62041/60.3 |
| $r_2 =$ | 690.278 | $d_2 =$ | 0.488 | | |
| $r_3 =$ | 94.200 | $d_3 =$ | 5.854 | $n_2/v_2 =$ | 1.62041/60.3 |
| $r_4 =$ | 39.421 | $d_4 =$ | 24.879 | | |
| $r_5 =$ | 104.883 | $d_5 =$ | 5.854 | $n_3/v_3 =$ | 1.62299/58.1 |
| $r_6 =$ | 40.090 | $d_6 =$ | 9.757 | | |

-continued

Relative aperture = 1 : 4.0, field angle = 94°, F = 100

| | | | | | |
|---|---|---|---|---|---|
| $r_7 =$ | 160.983 | $d_7 =$ | 52.198 | $n_4/v_4 =$ | 1.71736/29.5 |
| $r_8 =$ | −157.569 | $d_8 =$ | 9.757 | | |
| $r_9 =$ | −487.829 | $d_9 =$ | 13.952 | $n_5/v_5 =$ | 1.63854/55.4 |
| $r_{10} =$ | −81.711 | $d_{10} =$ | 0.537 | | |
| $r_{11} =$ | −229.279 | $d_{11} =$ | 5.854 | $n_6/v_6 =$ | 1.80518/25.4 |
| $r_{12} =$ | 138.348 | $d_{12} =$ | 4.878 | | |
| $r_{13} =$ | 9620.601 | $d_{13} =$ | 13.025 | $n_7/v_7 =$ | 1.48749/70.1 |
| $r_{14} =$ | −58.393 | $d_{14} =$ | 0.488 | | |
| $r_{15} =$ | −380.506 | $d_{15} =$ | 8.342 | $n_8/v_8 =$ | 1.51633/64.1 |
| $r_{16} =$ | −156.056 | | | | | backfocus = 180.770
$F_{1,2,3} = -58.038$
$F_{1,2,3,4} = -240.385$
$F_{1,2,3,4,5,6} = 153.846$
$d_1 + d_2 + d_3 + d_4 + d_5 + d_6 + d_7 = 116.104$
$d_8 + d_9 + d_{10} + d_{11} + d_{12} + d_{13} + d_{14} = 56.833$
Petzval's sum = 0.052

What is claimed is:

1. A small size retrofocus wide angle photographic lens system comprising seven groups of lenses consisting of a total of eight lens elements, in order of position from the object to the image side of the lens system: a positive meniscus lens convex to the object constituting the first group, a negative meniscus lens convex to the object constituting the second group, a negative meniscus lens convex to the object constituting the third group, a thick double convex positive lens constituting the fourth group, a positive meniscus lens convex to the image constituting the fifth group, a double concave negative lens and a double convex positive lens constituting the sixth group, said sixth group having a positive focal distance, and a positive meniscus lens convex to the object.

2. A small size retrofocus wide angle photographic lens system as recited in claim 1 further comprising a diaphram placed between the fourth and fifth lens groups.

3. A small size retorfocus wide angle photographic lens system as recited in claim 2 wherein the lens elements of the sixth group are cemented together.

4. A small size retrofocus wide angle photographic lens system as recited in claim 3 wherein the radii $r_1$ to $r_{16}$, the thickness and separations $d_1$ to $d_{15}$, the refractive indices $n_1$ to $n_8$, and the Abbe numbers $v_1$ to $v_8$ of the first to eighth lenses $L_1$ to $L_8$, respectively, satisfy the following conditions:

Relative aperture = 1:4.0, field angle 90°, F = 100

| | | | | | | |
|---|---|---|---|---|---|---|
| $L_1$ | $r_1 = 191.326$ | $d_1 = 17.969$ | $n_1 = 1.62041$ | $v_1 = 60.3$ |
| | $r_2 = 547.293$ | $d_2 = 0.486$ | | |
| $L_2$ | $r_3 = 95.726$ | $d_3 = 5.828$ | $n_2 = 1.62041$ | $v_2 = 60.3$ |
| | $r_4 = 36.788$ | $d_4 = 19.766$ | | |
| $L_3$ | $r_5 = 95.916$ | $d_5 = 5.828$ | $n_3 = 1.62230$ | $v_3 = 53.2$ |
| | $r_6 = 36.788$ | $d_6 = 9.956$ | | |
| $L_4$ | $r_7 = 122.554$ | $d_7 = 49.973$ | $n_4 = 1.71736$ | $v_4 = 29.5$ |
| | $r_8 = -173.051$ | $d_8 = 9.082$ | | |
| $L_5$ | $r_9 = -150.478$ | $d_9 = 9.519$ | $n_5 = 1.74077$ | $v_5 = 27.8$ |
| | $r_{10} = -69.448$ | $d_{10} = 0.534$ | | |
| $L_6$ | $r_{11} = -148.526$ | $d_{11} = 5.828$ | $n_6 = 1.80518$ | $v_6 = 25.4$ |
| | $r_{12} = 75.776$ | $d_{12} =$ is negligible | | |
| $L_7$ | $r_{13} = 75.776$ | $d_{13} = 15.104$ | $n_7 = 1.51823$ | $v_7 = 25.4$ |
| | $r_{14} = -53.621$ | $d_{14} = 1.845$ | | |
| $L_8$ | $r_{15} = -183.221$ | $d_{15} = 7.868$ | $n_8 = 1.79952$ | $v_8 = 42.2$ |
| | $r_{16} = -136.851$ | | | | backfocus = 180.030
$F_{1,2,3}$ = −53.763
$F_{1,2,3,4}$ = −216.920

-continued

| | | |
|---|---|---|
| $F_{1,2,3,4,5,6}$ | $-136.426$ | |
| $d_1 + d_2 + d_3 + d_4 + d_5 + d_6 + d_7 = 109.806$ | | |
| $d_8 + d_9 + d_{10} + d_{11} + d_{12} + d_{13} + d_{14} = 49.780$ | | |
| Petzval' sum $= 0.039$ | | |

5. A small size retrofocus wide angle photographic lens system as recited in claim 2 wherein the lens elements of the sixth group are separated from each other.

6. A small size retrofocus wide angle photographic lens system as recited in claim 5 wherein the radii $r_1$ to $r_{16}$, the thickness and separations $d_1$ to $d_{15}$, the refractive indices $n_1$ to $n_8$, and the Abbe numbers $\nu_1$ to $\nu_8$ of the first to eighth Lenses $L_1$ to $L_8$, respectively, satisfy the following conditions:

Relative aperture = 1:4.0, field angle = 94°, F = 100

| | | | | |
|---|---|---|---|---|
| $L_1$ | $r_1 = 231.621$ | $d_1 = 17.074$ | $n_1 = 1.62041$ | $\nu_1 = 60.3$ |
| | $r_2 = 690.278$ | $d_2 = 0.488$ | | |
| $L_2$ | $r_3 = 94.200$ | $d_3 = 5.854$ | $n_2 = 1.62041$ | $\nu_2 = 60.3$ |
| | $r_4 = 39.421$ | $d_4 = 24.879$ | | |
| $L_3$ | $r_5 = 104.883$ | $d_5 = 5.854$ | $n_3 = 1.62299$ | $\nu_3 = 58.1$ |
| | $r_6 = 40.090$ | $d_6 = 9.757$ | | |
| $L_4$ | $r_7 = 160.983$ | $d_7 = 52.198$ | $n_4 = 1.71736$ | $\nu_4 = 29.5$ |
| | $r_8 = -157.569$ | $d_8 = 9.757$ | | |
| $L_5$ | $r_9 = -487.829$ | $d_9 = 13.952$ | $n_5 = 1.63854$ | $\nu_5 = 55.4$ |
| | $r_{10} = -81.711$ | $d_{10} = 0.537$ | | |
| $L_6$ | $r_{11} = -229.279$ | $d_{11} = 5.854$ | $n_6 = 1.80518$ | $\nu_6 = 25.4$ |
| | $r_{12} = 38.348$ | $d_{12} = 44.878$ | | |
| $L_7$ | $r_{13} = 9620.601$ | $d_{13} = 13.025$ | $n_7 = 1.48749$ | $\nu_7 = 70.1$ |
| | $r_{14} = -58.393$ | $d_{14} = 0.488$ | | |
| $L_8$ | $r_{15} = -380.506$ | $d_{15} = 8.342$ | $n_8 = 1.51633$ | $\nu_8 = 64.1$ |
| | $r_{16} = -156.056$ | | | | backfocus = 180.770
$F_{1,2,3} = -58.038$
$F_{1,2,3,4} = -240.385$
$F_{1,2,3,4,5,6,} = 153.846$
$d_1 + d_2 + d_3 + d_4 + d_5 + d_6 + d_7 = 116.104$
$d_8 + d_9 + d_{10} + d_{11} + d_{12} + d_{13} + d_{14} = 56.833$
Petzval's sum = 0.052

* * * * *